United States Patent [19]

Nasu

[11] Patent Number: 4,715,805
[45] Date of Patent: Dec. 29, 1987

[54] APPARATUS FOR VACUUM COMPRESSION OF LAMINATED SHEET MATERIAL

[75] Inventor: Nobuo Nasu, Fukuyama, Japan

[73] Assignee: Kabushiki Kaisha Kawakami Seisakusho, Hiroshima, Japan

[21] Appl. No.: 28,750

[22] Filed: Mar. 23, 1987

Related U.S. Application Data

[62] Division of Ser. No. 913,528, Sep. 30, 1986.

[51] Int. Cl.⁴ .................................................. B28B 21/36
[52] U.S. Cl. .................................. 425/504; 83/925 CC; 156/382; 264/553; 264/571; 414/752; 425/388; 425/DIG. 19; 425/DIG. 60
[58] Field of Search .................. 83/176, 925 CC; 414/752; 425/500, 504, 405 R, 405 H, DIG. 19, DIG. 44, DIG. 50, 388; 264/101, 102, 138, 157, 160, 313–314, 553, 571, 500; 156/87, 99, 104, 105, 106, 107, 250, 267, 285–286, 381–382

[56] References Cited

U.S. PATENT DOCUMENTS

| | | | |
|---|---|---|---|
| 2,331,296 | 10/1943 | Bendix | 156/382 |
| 3,072,225 | 1/1963 | Cramer | 156/382 |
| 3,765,289 | 10/1973 | Gerber | 83/925 CC |
| 4,205,835 | 6/1980 | Gerber | 83/925 CC |
| 4,277,890 | 7/1981 | Portnoff | 83/925 CC |
| 4,425,406 | 1/1984 | Palma | 156/382 |
| 4,494,433 | 1/1985 | Gerber | 83/925 CC |
| 4,543,862 | 10/1985 | Levene | 83/176 |

FOREIGN PATENT DOCUMENTS 52-15831  5/1977  Japan .

Primary Examiner—Merrell C. Cashion, Jr.
Attorney, Agent, or Firm—Ladas & Parry

[57] ABSTRACT

A laminate consisting of a number of air-permeable sheets of a material is placed on the supporting surface of a table, and a major portion of the periphery of the laminate, inclusive of a lower surface thereof, is covered with a sheet impermeable to air. A suction pipe is arranged on the supporting surface along at least one side surface of the laminate and has a suction port faced toward the one side surface. A periheral portion of the suction port is covered with the air-impermeable sheet, and the laminate is compressed in the direction of its thickness by evacuating air from within a space defined by the air-impermeable sheet by vacuum producing means connected to the suction pipe. The air-impermeable sheet and laminate can be moved together with the suction pipe in parallel relation to the supporting surface, and they can be stopped at a desired position, during the evacuation process.

6 Claims, 14 Drawing Figures

APPARATUS FOR VACUUM COMPRESSION OF LAMINATED SHEET MATERIAL

This is a division of co-pending application Ser. No. 913,528, filed 9/30/86.

BACKGROUND OF THE INVENTION

This invention relates to a method and apparatus for subjecting a laminated sheet material to vacuum compression for use in applications where air permeable sheets of a material such a fabric are laminated and then cut.

A conventional vacuum compression method of the type described is disclosed in the specification of Japanese Patent Publication No. 52-15831. The method includes steps of supporting a laminate consisting of a number of air-permeable sheets of a material on the horizontal supporting surface of a table, covering the outer peripheral portion of the laminate with a sheet that is non-permeable with respect to air (which sheet shall be referred to as an "air-impermeable sheet"), and withdrawing the air from the interior of the laminate via a suction pipe extending from the side thereof by using means for producing a vacuum, thereby compressing the laminate in the direction of its thickness and holding the laminate on the supporting surface of the table.

In accordance with the this conventional method, the laminate of air-permeable sheets is merely held on the supporting surface of the table by the suction produced during the withdrawal of air, and the laminate and air-permeable sheet cannot be moved with respect to the table surface. This makes it difficult to carry out subsequent cutting of the laminate, lowers the efficiency of the cutting operation and imposes a restriction upon the structure of the table and table surface.

SUMMARY OF THE INVENTION

An object of the present invention is to provide a method of compressing laminated sheets by evacuation wherein a laminate composed of the sheets can be cut on a table easily and efficiently, and in which only a minor structural limitation is imposed upon the table and supporting surface.

Another object of the present invention is to provide a compression apparatus well-suited for practicing the method of the invention.

According to the present invention, the first object is attained by providing a method of vacuum compressing a laminate consisting of a number of air-permeable sheets of a material, comprising the steps of: covering a major portion of the periphery of the laminate, inclusive of a lower surface thereof, with an air-impermeable sheet on a supporting surface; facing a suction port of a suction pipe, which is arranged on the supporting surface along at least one side surface of the laminate, toward the one side surface; covering a peripheral portion of the suction port with the air-impermeable sheet; compressing the laminate by evacuating air from within a space defined by the air-impermeable sheet by vacuum producing means connected to the suction pipe; moving the air-impermeable sheet and the laminate together with the suction pipe in parallel relation to the supporting surface in a state where the air is evacuated from within the space; and stopping the air-impermeable sheet and the laminate together with the suction pipe on the supporting surface in a state where the air is evacuated from within the space.

According to the present invention, the second object is attained by providing an apparatus for vacuum compressing a laminate consisting of a number of air-permeable sheets of a material, comprising: a table having a supporting surface for supporting the laminate; vacuum producing means for evacuating air from within a space defined by an air-impermeable sheet covering a major portion of the periphery of the laminate, inclusive of a lower surface thereof, supported on the supporting surface; a suction pipe arranged on the supporting surface along at least one side surface of the laminate and connected to the vacuum producing means, the suction pipe having a suction port facing the one side surface of the laminate; and support means for supporting the suction pipe in such a manner that the suction pipe is capable of being moved in parallel relation to the supporting surface.

In accordance with the method of the invention, a major portion of the periphery of the laminate of air-permeable sheets, inclusive of the lower surface of the laminate, is covered with the air-impermeable sheet. Therefore, when the air within the space defined by the air-impermeable sheet is withdrawn from the side surface of the laminate, the latter is compressed in the direction of its width. However, unlike the prior-art method in which the lower surface of the laminate is not covered with the air-impermeable sheet, the present invention interposes the air-impermeable sheet between the laminate and the supporting surface of the table. As a result, a force pressing the laminate downwardly against the supporting surface is not produced, so that the laminate and air-impermeable sheet can be readily moved in unison along with the suction pipe on the supporting surface with application of little force during the air evacuating process. Accordingly, the laminate and air-impermeable sheet can be moved to a position on the table at which they can be easily cut by an automatic or manually operated cutting machine. This makes it possible to shorten the traveling distance of the cutting blade of the cutting machine, and enables the laminate to be moved at the same time that the cutting blade is returned to its home position. This results in a cutting operation of improved efficiency.

In accordance with the apparatus of the invention, a moving mechanism is provided on the support means for the suction pipe, the suction pipe is provided with the suction port for evacuating the air from the side surface of the laminate, and the suction pipe is connected to the vacuum producing means and is moved in parallel relation to the supporting surface of the table by the support means. Accordingly, the table need only be provided with members for mounting the support means regardless of whether the suction pipe is supported on the outside of the table or on the table by the support means. Thus, there is little restriction placed upon the structure of the table and supporting surface, and the overall structure is comparatively simple. In addition, the arrangement is such that a cutting blade guide of a cutting machine can be inserted between the supporting surface and the air-impermeably sheet covering the lower surface of the laminate. Thus the apparatus is well-suited for practicing the method of the invention set forth above.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A first embodiment of a compression apparatus according to the present invention will now be described with reference to FIGS. 1 and 2.

Figure 1:
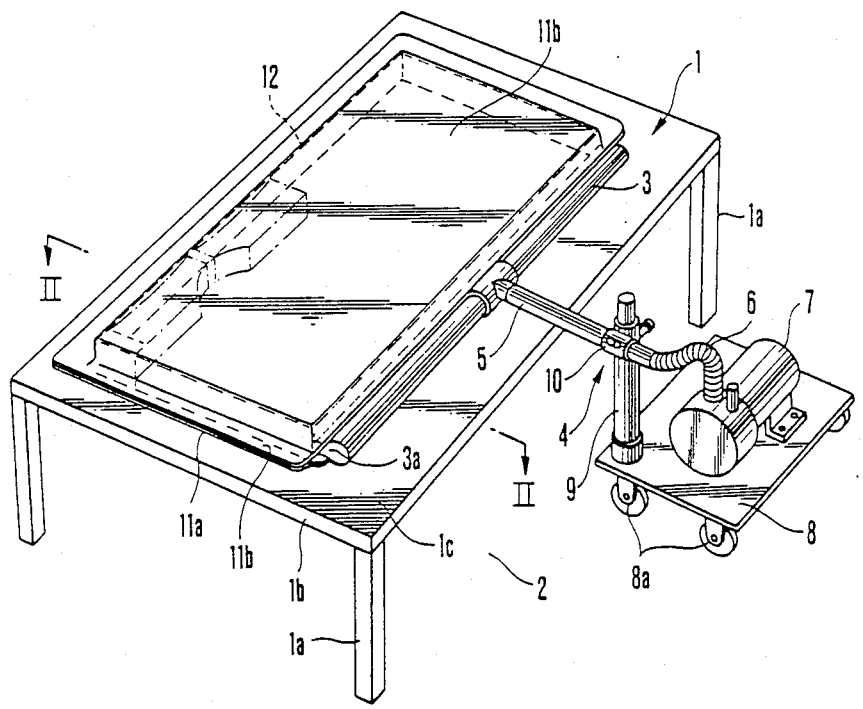
FIG. 1 is a perspective view illustrating the principal portion of a first embodiment of a laminated sheet material vacuum compression apparatus according to the present invention.

As shown in FIG. 1, the apparatus includes a table 1 having a bed plate 1b fixedly secured on a horizontal floor 2 by legs 1a. The bed plate 1b has a supporting surface 1c over which a suction pipe 3 is arranged in spaced relation along one longitudinal side edge of the bed plate 1b. The suction pipe 3 has a suction port 3a formed in its inward side. Fixedly connected to the outward side of the suction pipe 3 is one end of a connection pipe 5, which also serves as a portion of support means 4. The other or outer end of the connection pipe 5 extends beyond the edge of the table 1 and is connected by a flexible hose 6 to the suction side of a vacuum pump 7, which serves as means for producing a vacuum. The vacuum pump 7 is fixedly secured to a wagon 8 having a vertically upstanding support post 9 on which a holder 10 is fitted so as to be movable up and down therealong. The holder 10 holds the connection pipe 5 in such a manner that the pipe 5 can be advanced and retracted therethrough. The wagon 8 is provided with casters 8a equipped with stoppers, which are not shown. It should be noted that the aforementioned support means 4, which is for supporting the suction pipe 3, is constituted by the connection pipe 5, wagon 8, support post 9 and holder 10.

Figure 2:
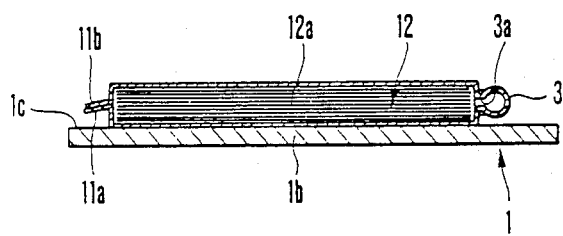
FIG. 2 is a sectional view taken along line II—II of FIG. 1.

A laminated sheet material is subjected to vacuum compression using the above-described apparatus of the present embodiment through a method illustrated in FIG. 2. Specifically, an air-impermeable sheet 11a consisting of a sheet of synthetic resin such as polyvinyl chloride, a sheet of paper or the like is placed on the supporting surface 1c of table 1. Next, a laminate 12 of a number of air-permeable sheets 12a such as fabric is placed on the air-impermeable sheet 11a, and an air-impermeable sheet 11b similar to the sheet 11a is placed on laminate 12. Thus, the major portion of the periphery of laminate 12, inclusive of its lower surface, is covered by the air-impermeable sheets 11a, 11b. One longitudinal side surface of the laminate 12 is left uncovered by the air-impermeable sheets 11a, 11b. This uncovered side surface is aligned with the suction pipe 3, which is brought into direct opposition with this side surface so that the suction port 3a may abut against the same. The air-impermeable sheets 11a, 11b are arranged to cover the upper and lower sides of the suction port 3a as well as both ends thereof. Thus, with the exception of the portion confronting the suction port 3a, the entire outer periphery of the laminate 12 is covered by the air-impermeable sheets 11a, 11b, in which condition the laminate 12 rests upon the supporting surface 1c.

Figure 3:
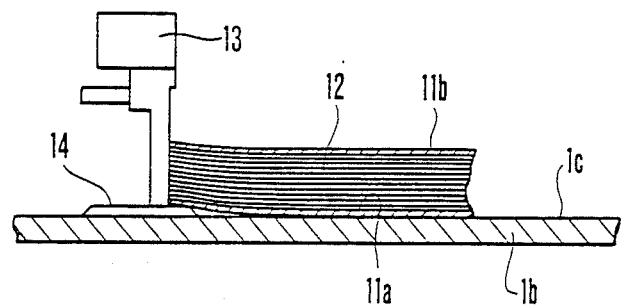
FIG. 3 is side view showing a laminate being cut in the apparatus of FIG. 1.

Under these conditions, the vacuum pump 7 is driven to withdraw the air from the interior of the area defined by the air-impermeable sheets 11a, 11b, the air withdrawn passing through the suction pipe 3, connection pipe 5 and flexible hose 6. As a result, the interior of the space defined by the air-impermeable sheets 11a, 11b is depressurized to compress the laminate 12 in the direction of its thickness. With the laminate 12 thus compressed, the wagon 8 may be formed freely on the floor 2 by way of the casters 8a. This enables the suction pipe 3, laminate 12 and air-impermeable sheets 11a, 11b to be grasped manually and moved longitudinally and transversely over the supporting surface 1c in parallel relation thereto until a desired position is reached. The stoppers (not shown) of the casters 8a are then engaged to fix the wagon 8 on the floor 2, thereby fixing the suction pipe 3, laminate 12 and air-impermeable sheets 11a, 11b. With these items thus fixed, a plate-shaped guide 14 of a cutting machine 13 is moved and inserted between the supporting surface 1c and the air-impermeable sheet 11a, which covers the lower surface of the laminate 12, as depicted in FIG. 3. A cutting blade (not shown) is then made to cut the laminate 12, along with the air-impermeable sheets 11a, 11b, into a desired pattern. It should be noted that the laminate 12 is pressed against the supporting surface 1c together with the air-impermeable sheets 11a, 11b by hand or by suitable means when the cut is made. At the end of a single cutting operation, the stoppers are disengaged to free the casters 8a when necessary so that the laminate 12 may be moved, fixed and then cut again in the manner set forth above.

Figure 4:
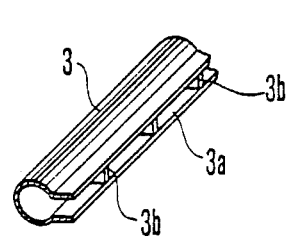
FIGS. 4(a), (b), (c) and (d) are partial perspective views each illustrating a variant of a suction pipe according to the present invention.
Figure 4:
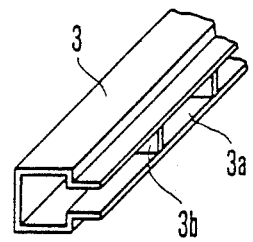
Figure 4:
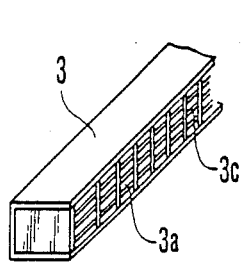
Figure 4:
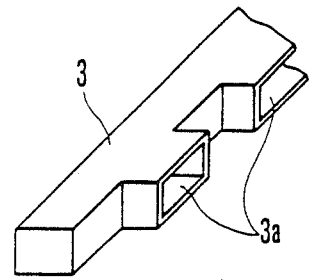

FIGS. 4(a) through (d) illustrate variants of the structure of suction pipe 3 according to the present invention. In FIG. 4(a), the suction pipe 3 has a generally circular cross section and is closed at both ends, and the suction port 3a is provided with partitioning plates 3b extending transversely of the pipe. In FIG. 4(b), the suction pipe 3 has a generally rectangular cross section, and the suction port 3a is provided with partitioning plates 3b extending transversely of the pipe. In FIG. 4(c), a wire mesh 3c is disposed across the opening to the suction port 3a, which is formed in the suction pipe 3 of generally rectangular cross section. In FIG. 4(d), the suction pipe 3 of generally rectangular cross section is formed to include projecting suction ports 3a at suitable intervals, each port 3a having a generally prismatic configuration.

Figure 5:
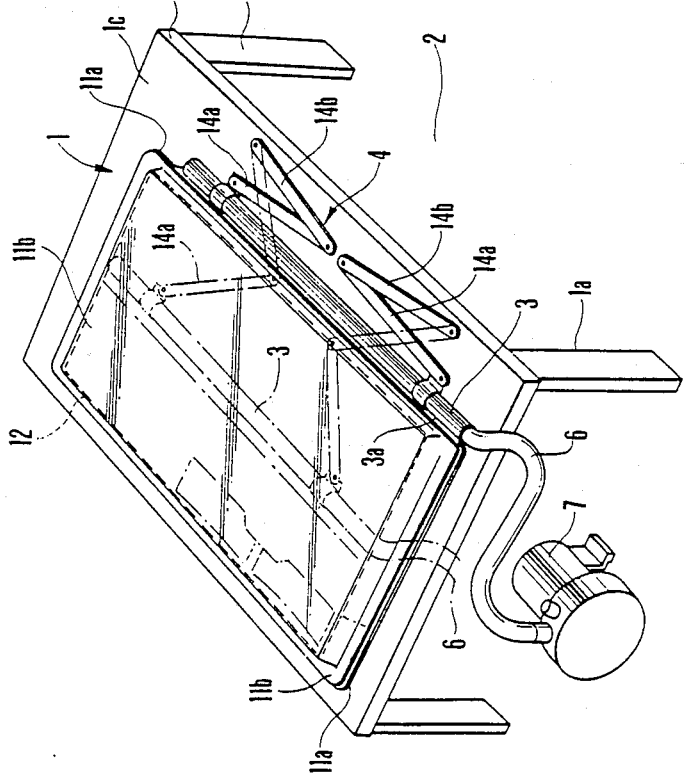
FIG. 5 is a perspective view illustrating the principal portion of a second embodiment of a laminated sheet material vacuum compression apparatus according to the present invention.

A second embodiment of the present invention is illustrated in FIG. 5, in which the suction pipe 3 is supported on the supporting surface 1c of table 1 by the support means 4, which includes a moving mechanism comprising two sets of link levers 14a, 14b. In each set, one end of link lever 14a is fastened to the suction pipe 3, one end of link lever 14b is pivotally attached to the table 1, and the other ends of these link levers are pivotally interconnected in a V-shaped configuration so that the suction pipe 3 and, hence, the laminate 12 and air-impermeable sheets 11a, 11b, can be moved transversely of the table 1, as illustrated by the dot-and-dash lines in FIG. 5.

Figure 6:
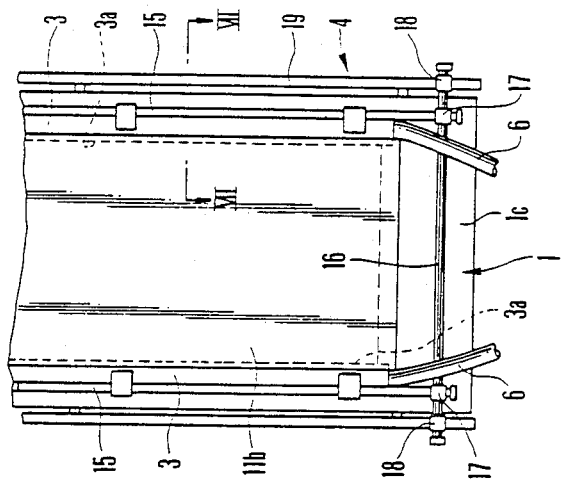
FIG. 6 is a partial plan view illustrating a modification of support means according to the present invention.
Figure 7:
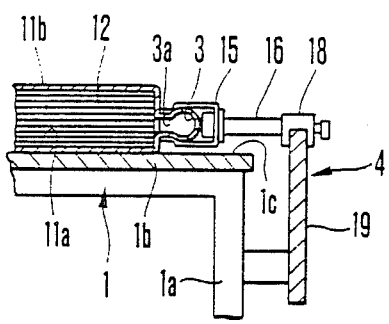
FIG. 7 is a sectional view taken along line VII—VII of FIG. 6.

A modification of the support means is illustrated in FIGS. 6 and 7. Here a pair of the suction pipes 3 are secured to respective holding rods 15 in such a manner that the suction ports 3a of these pipes 3 abut against two longitudinal side surfaces (left and right side surfaces as viewed in FIG. 6) of the laminate 12. Both ends of each of the holding rods 15 are retained by connecting rods 16 via cylindrical holders 17 in such a manner that the holding rods 15 can be moved transversely of the laminate 12. Each end of the connecting rod 16 is held by a receiving member 19 via a connecting piece 18 having an inverted U-shaped cross section, the arrangement being such that the holding rod 15 is capable of being moved transversely of the laminate 12. The receiving member 19 is secured to the leg 1a of table 1, and one end of each of the suction pipes 3 is connected to the vacuum pump 7 via a corresponding one of the flexible hoses 6.

Figure 9:
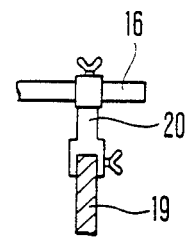
FIG. 9 is a partial sectional view taken along line IX—IX of FIG. 8.
Figure 8:
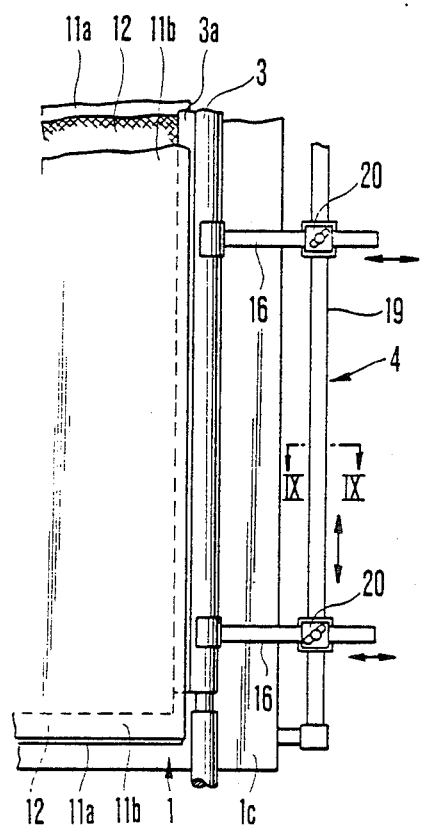
FIG. 8 is a partial plan view illustrating another modification of support means according to the present invention.

A modification of the support means is illustrated in FIGS. 8 and 9. Two connecting rods 16, one front and one rear, are provided, and the inward ends thereof are secured to the suction pipe 3. The outer end portions of the connecting rods 16 are supported on the receiving member 19 via holder/connecting pieces 20 so as to be movable longitudinally and transversely of the laminate 12.

Figure 10:
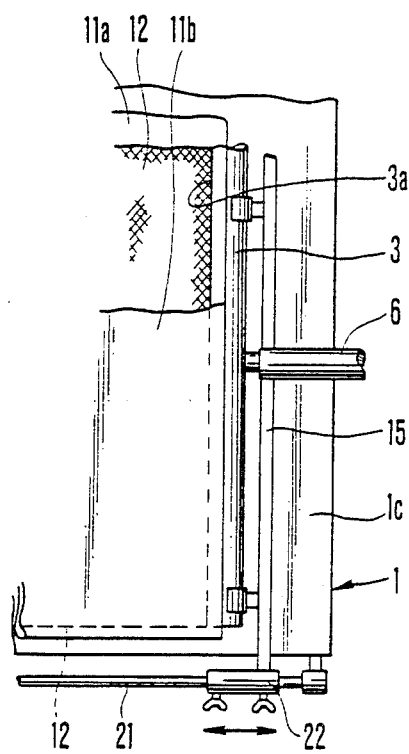
FIG. 10 is a partial plan view illustrating another embodiment of support means according to the present invention.

In FIG. 10, which illustrates another embodiment of the support means, the holding rod 15 is secured to the suction pipe 3 in parallel relation thereto, and each end portion of the holding rod 15 is retained on a receiving member 21, which is secured to the table 1, via a connecting piece 22 in such a manner that the holding rod 15 is capable of being moved only left and right, i.e., transversely of the laminate 12.

Figure 11:
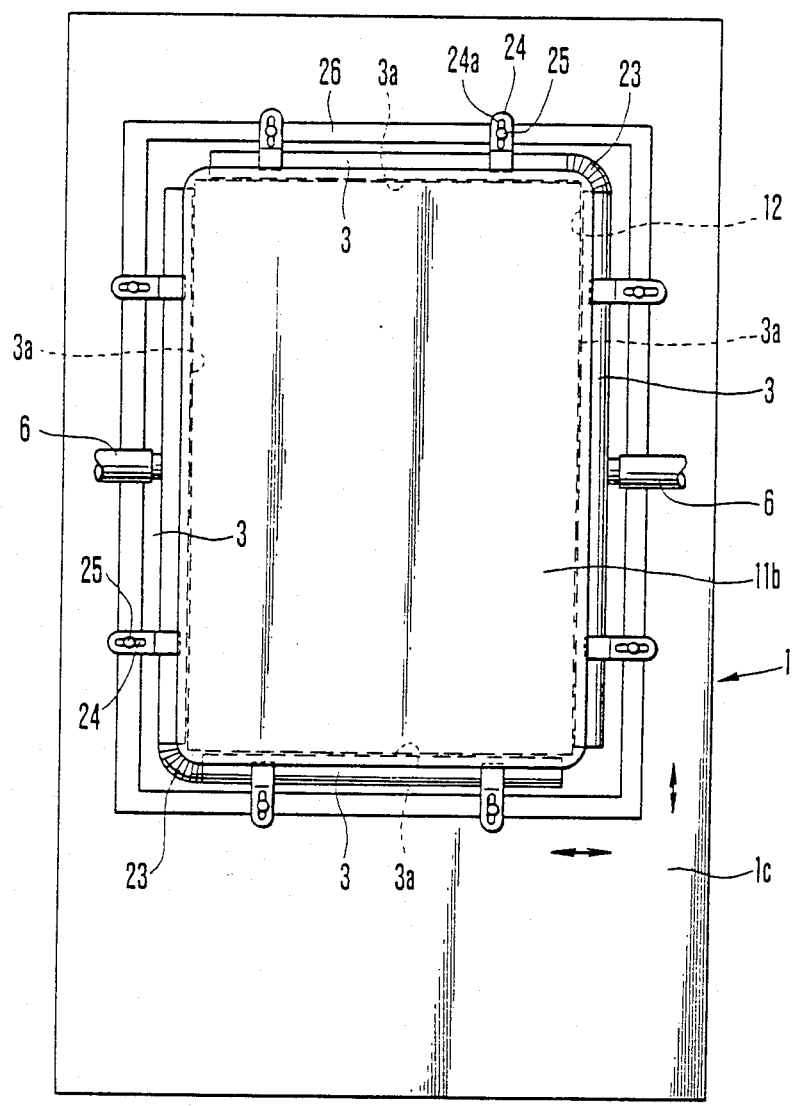
FIG. 11 is a plan view illustrating a principal portion of a variant of support means according to the present invention.

FIG. 11 is a plan view illustrating a variant of support means according to the present invention. In this arrangement, four of the suction pipes 3 are provided and disposed in such a manner that their suction ports 3a oppose and abut against the four side surfaces of the laminate 12. Two of the suction pipes 3 whose ends meet at one corner of the laminate 12 are interconnected by flexible pipe 23, as are the two suction pipes 3 whose ends meet at the diagonally opposite corner of the laminate 12. A holder 24 secured to each suction pipe 3 has a slot 24a in which a setscrew 25 is inserted to connect the holder 24 to a holder frame 26 so that the suction pipe 3 can be moved inward and outward. The holder frame 26 is so adapted as to be movable left and right as well as back and forth in FIG. 11 by suitable means. This arrangement having the above-described variant of the support means and the four suction pipes operates in substantially the same manner as the embodiment of FIGS. 1 and 2. Further, in FIGS. 6 through 11, portions corresponding to those in FIGS. 1 and 2 are designated by like reference characters.

In the present invention, the holders 10, 17, the connection piece 18, the holder/connecting piece 20 and the connecting piece 22 are all fixed by setscrews, though other means besides setscrews may be employed to fix these members. In addition, movement of the suction pipe can be achieved by power supplied by a drive mechanism such as a motor or cylinder arrangement acting through the support means.

It is also permissible to provide the bed plate of the table with a multiplicity of blow holes from which air may be blown upwardly to lift the laminate and air-impermeable sheets from the supporting surface of the table, thus enabling the laminate and air-impermeable sheets to be moved with application of but little force.

Further, it is permissible to use a single air-impermeable sheet to cover the upper and lower surfaces of the laminate by folding the sheet in half. In an alternative arrangement, a laminate which is generally covered beforehand externally of the table is then placed on the table, the suction port of the suction pipe is abutted against one side surface of the laminate, as mentioned above, and the entire periphery of the laminate with the exception of said one side surface is covered with a air-impermeable sheet.

In accordance with the vacuum compression method of the present invention as described above, the major portion of the periphery of a laminate comprising air-permeable sheets, inclusive of the lower surface of the laminate, is covered with air-impermeable sheets, and the air in the space defined by the air-impermeable sheets is evacuated from one side of the laminate. Owing to the presence of the air-impermeable sheet between the laminate and the supporting surface of the table, a force that presses the laminate against its lower surface is not applied. As a result, the laminate and the air-impermeable sheets, along with the suction pipe, can be moved on the supporting surface with ease under the application of but a small force while the air is being withdrawn from the laminate. This enables the laminate to be moved to a position on the table where it can be easily cut by a cutting machine, thereby facilitating the cutting operation.

The compression apparatus for practicing this method uses support means for supporting the suction pipe on the table or on an object other than the table. The suction pipe is provided with a suction port for withdrawing the air from the side surface of the laminate, and the suction pipe is connected to means for producing a vacuum. Accordingly, the above-described vacuum compression method can be implemented through a comparatively simple structure in which little limitation is imposed upon the structure of the table and support surface.

As many apparently widely different embodiments of the present invention can be made without departing from the spirit and scope thereof, it is to be understood that the invention is not limited to the specific embodiments thereof except as defined in the appended claims.

What we claim is:

1. An apparatus for vacuum compressing a laminate consisting of a number of air-permeable sheets of a material, comprising:
   a table having a supporting surface for supporting the laminate;
   vacuum producing means for evacuating air from within a space defined by an air-impermable sheet covering a major portion of the periphery of the laminate, inclusive of a lower surface thereof, supported on said supporting surface;

a suction pipe arranged on said supporting surface along at least one side surface of the laminate and connected to said vacuum producing means, said suction pipe having a suction port facing the one side surface of the laminate; and support means for supporting said suction pipe in such a manner that said suction pipe is capable of being moved in parallel relation to said supporting surface.

2. The apparatus according to claim 1, further comprising a flexible hose for connecting said suction pipe to said vacuum producing means.

3. The apparatus according to claim 2, wherein said support means is connected to a driving mechanism, and said suction pipe is moved together with the laminate and air-impermeable sheet by said driving mechanism.

4. The apparatus according to claim 2, wherein said support means is mounted on said table.

5. The apparatus according to claim 1, wherein said support means is mounted on said table.

6. The apparatus according to claim 5, wherein said support means is connected to a driving mechanism, and said suction pipe is moved together with the laminate and air-impermeable sheet by said driving mechanism.

* * * * *